United States Patent [19]

Hill et al.

[11] Patent Number: 5,607,279

[45] Date of Patent: Mar. 4, 1997

[54] TOWING LIFT ACCESSORY

[76] Inventors: Richard W. Hill; Mary A. Hill, both of 54562 Benecia Trial, Yucca Valley, Calif. 92284

[21] Appl. No.: 507,826

[22] Filed: Jul. 27, 1995

[51] Int. Cl.⁶ ........................................ B60P 3/12
[52] U.S. Cl. .................. 414/478; 414/494; 414/539; 414/559; 414/563; 414/786
[58] Field of Search ........................ 414/477–480, 414/494, 563, 539, 540, 559, 786; 280/402; 212/168

[56] References Cited

U.S. PATENT DOCUMENTS

| | | | |
|---|---|---|---|
| 2,553,229 | 5/1951 | Barhorst | 280/402 X |
| 2,719,730 | 10/1955 | Beck | 414/563 X |
| 3,690,482 | 9/1972 | Gaumont | 414/563 |
| 4,186,938 | 2/1980 | Youngblood | 414/563 X |
| 4,216,941 | 8/1980 | Little | 414/563 X |
| 4,265,463 | 5/1981 | Perruso | 414/563 X |
| 4,269,396 | 5/1981 | Easterwood | 414/563 X |
| 4,795,303 | 1/1989 | Bubik | 414/563 X |
| 5,205,700 | 4/1993 | Lin et al. | 414/540 |
| 5,326,216 | 7/1994 | Russ | 414/563 |
| 5,350,271 | 9/1994 | Weller | 414/563 |

FOREIGN PATENT DOCUMENTS

| | | | |
|---|---|---|---|
| 1772013 | 10/1992 | U.S.S.R. | 414/539 |
| 1830014 | 7/1993 | U.S.S.R. | 414/563 |

*Primary Examiner*—David A. Bucci
*Attorney, Agent, or Firm*—Sheldon & Mak

[57] ABSTRACT

A boom accessory for a flatbed tow truck includes a frame that is lockable onto a power underlift hoist of the truck by retraction of a ram of the hoist against the frame. The frame includes a base for engagement on the ram, an upwardly and rearwardly extending boom member, and optionally, a rearwardly facing trailer hitch socket for permitting trailers to be towed with the boom accessory in place. A sheave assembly is pivotally mountable atop the boom member for engaging a hook cable extending from a winch unit of the truck, the accessory extending the utility of the tow truck by enabling retrieval of disabled vehicles from relatively remote locations, the accessory having a particularly robust attachment to the tow truck without significant modification of the truck. A method for hoisting a load by the flatbed tow truck includes the steps of providing the boom accessory; extending the ram; resting the base on the ram; retracting the ram for clamping the base between the head portion of the ram and the leg member; threading the cable over the sheave; connecting the cable to the load; and activating the winch for moving and hoisting the load, the cable being movably supported by the sheave.

20 Claims, 1 Drawing Sheet

TOWING LIFT ACCESSORY

BACKGROUND

The present invention relates to towing vehicles, and more particularly to an attachable boom accessory for flatbed a tow truck.

Towing vehicles, commonly known as "tow trucks", include traditional types having rear-mounted hoist booms in addition to more recently developed flatbed trucks that employ tilting and extension mechanisms for orienting a bed member as an inclined ramp for receiving a vehicle, the bed being moved to a horizontally oriented carrying position subsequent to receipt of the vehicle. The truck is equipped with a cable winch that is located at or ahead of a front extremity of the bed for drawing the vehicle onto the bed. When the winch is required to move a vehicle from a relatively remote location (such as when retrieving a vehicle that has left the road), the bed and/or the cable is subject to becoming damaged as the cable is drawn forcibly over a rear extremity of the bed. Attempts to overcome this difficulty include sheave and/or boom attachments for connection to anchor points that are normally provided on rear portions of the bed.

It is also known to provide hydraulic underlifts at the rear of flatbed tow trucks, the underlifts having a wheel lift or "T-bar" connected thereto for towing a vehicle in addition to the load carried on the bed.

The sheave and/or boom attachments of the prior art are subject to a number of disadvantages, including the following:

1. The bed provides insufficient structural integrity for supporting the attachment, particularly against oblique loading as can occur when the vehicle or other load to be acquired is some distance to one side or below the tow truck;
2. They are awkward and time-consuming to install and remove from the truck; and
3. The excessively interfere with normal load-carrying on the bed.

Thus there are many instances in which a flatbed tow truck is used for responding to an emergency, and upon arrival at the scene it is discovered that a boom-type tow truck is needed for retrieving a disabled vehicle that is stuck in sand or the like. Unless special retrieval difficulties are known to exist, the dispatch of boom-type tow trucks is normally avoided, especially in multi-vehicle emergencies, because such trucks can tow only a single vehicle. In contrast, a flatbed truck having an auxiliary lift can tow a pair of disabled vehicles.

Accordingly, there is a need for a hoist boom accessory for flatbed tow trucks that avoids the disadvantages of the prior art.

SUMMARY

The present invention meets this need by providing a boom accessory that attaches to an underlift hoist of a flatbed tow truck, being locked in position by retraction of the underlift hoist. In one aspect of the invention, the accessory includes a base for engaging an underlift hoist ram of the truck, a boom member rigidly extending upwardly and rearwardly from the base for mounting a sheave that can movably support a winch hook cable of the truck, and means for holding the base in engagement with the ram when the ram is retracted against the base. The mounting for the sheave can include a sleeve member extending within an end extremity of the boom member for receiving a sheave assembly stem, and the accessory can include the sheave in an assembly with a yoke member that incorporates the stem. The base can have a rearwardly extending arm for engaging the underside of a forwardly extending head portion element of the underlift hoist for holding a rear portion of the base from moving away from the ram. Preferably, a pair of such arm members extend near opposite sides of the ram for enhancing the engagement stability of the base. The base can include a channel member having flanges projecting along opposite sides of the ram for further stabilizing the engagement.

A portion of the base can extend within a rearwardly facing cavity that is formed between a leg member of the hoist and the ram, the ram telescopingly engaging the leg member, the engagement by the base locking same against movement away from an adjacent portion of the ram when the ram is retracted against the base. Further, and in the alternative, the accessory can include a front arm member that extends forwardly from near the base for engaging a laterally extending element of the truck to effect the locking. The laterally extending element can be provided by a socket member that is rigidly attached to the arm member in parallel relation to the ram.

The tow truck is normally provided with a plurality of anchor stations, typically chain-hook attachment points that are formed in the bed. Preferably the accessory includes an anchor member located near a free end extremity of the boom member for connection of a stabilizing element to a selected one of the anchor stations. The accessory can include a pair of stabilizing elements for engaging corresponding ones of the anchor stations, the elements being tensionable by moving the underlift relative to the anchor stations.

Another aspect of the invention provides a method for hoisting a load by an existing flatbed tow truck having a tiltable, extendable bed for receiving a first disabled vehicle, a winch mounted to the truck ahead of the bed and having a cable for drawing the first vehicle onto the bed, and an underlift pivotally connected beneath a rear extremity of the bed when the bed is in a retracted position thereof, the underlift having a rearwardly projecting ram for extending and retracting a T-bar or wheel lift, the ram axially projecting forwardly from a head portion thereof into a supporting leg member of the underlift, the method including the steps of:

(a) providing a boom accessory having a base and a boom member extending upwardly and rearwardly from the base, a sheave being rotatably mounted from the boom member;
(b) extending the ram;
(c) resting the base on the ram;
(d) retracting the ram for clamping the base between the head portion of the ram and the leg member;
(e) threading the cable over the sheave;
(f) connecting the cable to the load; and
(g) activating the winch for moving and hoisting the load, the cable being movably supported by the sheave.

The head portion of the ram can have a forwardly extending element, the boom accessory having a first arm member rearwardly extending from proximate the base, the method including the further step of engaging the first arm member with the forwardly extending element following the step of extending the ram. The leg member can define a rearwardly facing cavity extending forwardly of a rear extremity of the leg, the method including the further step of engaging a forwardly projecting portion of the accessory with the rearwardly facing cavity, the base being locked between a portion of the leg and the forwardly extending element in the step of retracting the ram. The truck can have a laterally extending element, the boom accessory including a second arm member forwardly extending from proximate the base, the method including the further step of engaging the second arm member with the laterally extending element following the step of extending the ram.

DRAWINGS

These and other features, aspects, and advantages of the present invention will become better understood with reference to the following description, appended claims, and accompanying drawings, where:

DESCRIPTION

Figure 1:
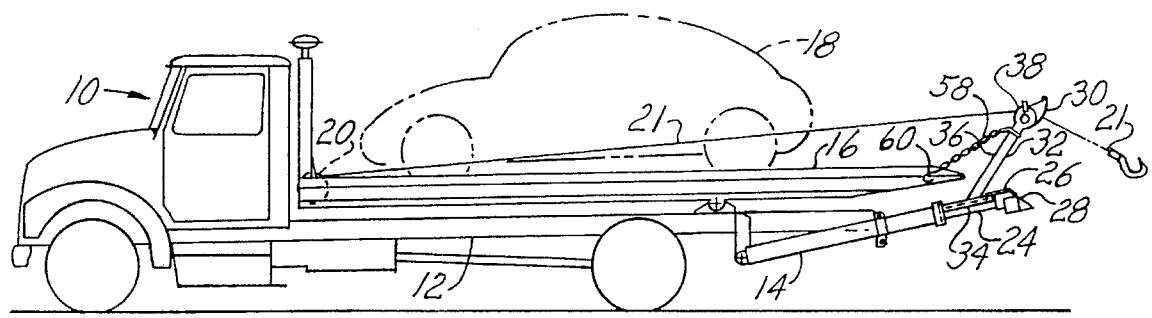
FIG. 1 is a side elevational view of a flat bed tow truck having an underlift hoist, the truck being equipped with a hoist boom accessory according to the present invention.
Figure 2:
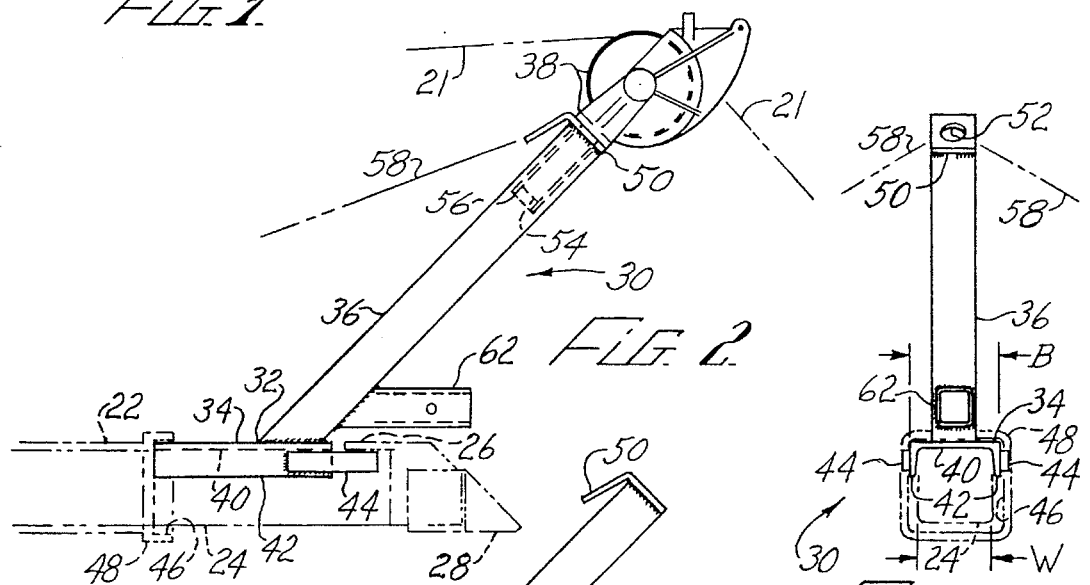
FIG. 2 is a side elevational view of the accessory of FIG. 1.
Figure 3:
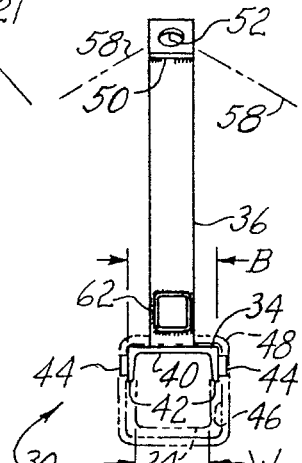
FIG. 3 is a rear elevational view of a boom unit of the accessory of FIG. 1.

The present invention is directed to a hoist boom accessory for a flatbed tow truck, the accessory being particularly suitable for extending the utility of the tow truck. With reference to FIGS. 1–3, a flatbed tow truck 10 having a chassis 12 includes an underlift hoist 14 and tiltable, extendable bed 16 for receiving a first disabled vehicle 18. A winch unit 20 is mounted proximate a front extremity of the bed 16 and having a hook line 21 for advancing the vehicle 18 onto the bed 16 in a conventional manner. The underlift hoist 14 includes a leg member 22 that is vertically pivotable relative to the chassis 12, and a telescoping ram 24 that projects rearwardly from the leg member 22 for supporting a head member 26 of a T-bar/wheel lift 28, by which a second disabled vehicle (not shown) is transportable by the tow truck 10.

According to the present invention, a hoist boom apparatus 30 is selectively mountable on the underlift hoist 14 for facilitating acquisition of the disabled vehicle 18 from locations not otherwise accessible using the truck 10. The boom apparatus 30 includes a frame 32 having a base 34 for engaging the ram 24, and a boom member 36 that projects upwardly and rearwardly at an angle A from the base 34 for supporting a sheave assembly 38. The base 34 is configured for straddling the ram 24 when the ram 24 is sufficiently extended from the leg member 22, the frame 32 being locked relative to the leg member 22 when the ram 24 is subsequently retracted against the frame 32. In an exemplary configuration of the frame 32, the base 34 is configured as a channel member having a generally horizontally disposed web portion 40 that extends between depending flange portions 42 within an overall width B of the channel, the flange portions 42 being spaced sufficiently for clearing a width W of the ram 24. A pair of rear arm members 44 project rearwardly under a portion of the head member 26 from the base 34 for preventing a rear portion of the base 34 from lifting away from the ram 24. Also, a front extremity of the base 34 projects forwardly into a leg cavity 46 that surrounds the ram 24, the cavity 46 being formed by a rearwardly projecting reinforcing band 48 of the leg member 22, the engagement of the base 34 with the cavity 46 preventing a front portion of the base 34 from lifting away from the ram 24, the combination of the above-described engagements holding the frame 32 locked in position on the ram 24 when the ram 24 is retracted against the base 34. As further shown in FIG. 2, the frame 32 includes an angle plate 50 that is affixed to an upper extremity of the boom member 36, the plate 50 having an opening 52 for receiving a stem 54 of the sheave assembly 38, a sleeve member 56 rigidly extending within the boom member 36 from the plate 50 and engaging the stem 54 for pivotally locating the sheave assembly 38 in axial alignment with the boom member 36.

The apparatus 30 preferably includes a pair of stabilizing elements 58 for hooking onto laterally spaced anchor points of the bed 16 as indicated at 60 in FIG. 1. The stabilizing elements 58, which can be chains having respective anchor hooks thereon, are connected to a forwardly and downwardly extending portion of the angle plate 50, the elements 58 extending downwardly and outwardly therefrom to the anchor points 60. Installation of the apparatus 30 is thus completed by locking the frame 32 to the underlift hoist 14 as described above; attaching the sheave assembly 38 by lowering the stem 54 into the opening 52 (preferably with the hoist 14 lowered for facilitating placement of the sheave assembly 38); engaging the hook line 21 with the sheave assembly 38; connecting the stabilizing elements 58 from the plate 50 to the anchor points 60; and preloading the stabilizing elements 58 by raising the hoist 14 and/or moving the bed 16. Normally, the bed 16 is moved rearwardly a few inches prior to the step of preloading, the preloading being completed by moving the bed 16 forwardly.

An optional but preferred feature of the apparatus 30 is a rearwardly extending hitch socket member 62 that forms a part of the frame 32 for receiving a conventional trailer hitch accessory (not shown). The socket member 62 is advantageous for facilitating towing of a trailer (not shown) that may have been connected to the disabled vehicle, the frame 32 being left in place locked onto the underlift hoist 14 when the tow truck 10 is towing the trailer. It will be understood that when the socket member 62 is in use the underlift hoist is normally lowered somewhat from the position shown in FIG. 1 (with corresponding adjustment of the stabilizing elements 58). As best shown in FIG. 2, the socket member 62 is configured for receiving a conventional transverse hitch retainer (not shown).

Figures 4, 5:
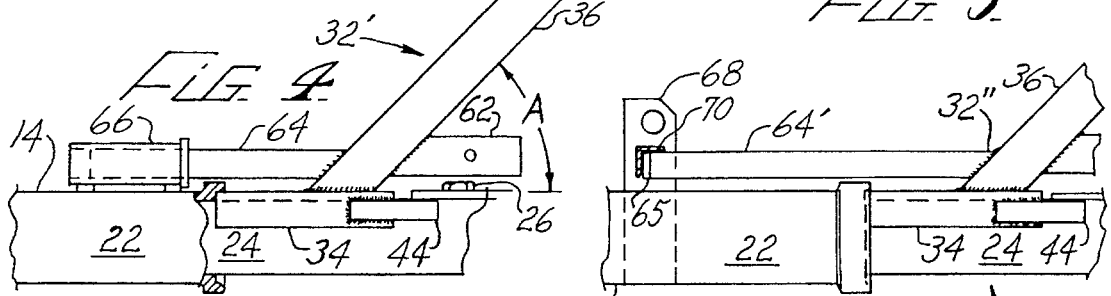
FIG. 4 is a side elevational view showing an alternative configuration of the boom unit of FIG. 3 in use with a modified counterpart of the underlift hoist of FIG. 1.
FIG. 5 is a partial side elevational view showing another alternative configuration of the boom unit of FIG. 2 engaging a variant of the underlift hoist of FIG. 1.

With further reference to FIG. 4, an alternative configuration of the frame, designated 32', is adapted for use in situations wherein the leg cavity 46 is either not present or insufficiently large for reliably locking with the base 34. The frame 32' includes a forwardly extending front arm member 64 that extends rigidly from the boom member 36 in parallel relation to the base 34, being offset upwardly therefrom sufficiently for clearing the reinforcing band 48. The underlift hoist 14 is modified by rigidly mounting a frame socket body 66 to the leg member 22 in parallel alignment with the ram 24 for receiving the front arm 64, the engagement of the front arm 64 with the socket body 66 preventing the front portion of the base 34 from moving away from the ram 24.

With further reference to FIG. 5, another alternative configuration of the frame, designated 32", has a lengthened counterpart of the front arm, designated 64', and having a cap member 65 attached thereto, the arm 64' extending together with the cap member 65 into engagement with existing structure. For example, the underlift hoist 14 has a pair of lock plates 68 rigidly attached to opposite sides of the leg member 22 for locking same in a selected elevational orientation relative to the chassis 12, a brace member 70 extending horizontally between the plates 68. As shown in FIG. 5, the front arm 64' and the cap member 65 extend under a portion of the brace member 70 for preventing the front portion of the base 34 from moving away from the ram 24. Further, the brace member 70 can have a generally vertically extending face (being formed of a structural angle having rearwardly and downwardly extending flanges, for example), both front and top surfaces of the cap member 65 engaging the member 70 for further preventing forward movement of the frame 32" in response to the above-described clamping by the ram 24. Moreover, the cap member 65 preferably extends laterally on opposite sides of the arm member 64' to proximate the lock plates 68 for enhancing resistance to twisting movement of the frame 32 on the underlift hoist 14. It will be understood that the front arms 64 and 64' of FIGS. 4 and 5 each project under a laterally extending member (top portions of the socket body 66 and the brace member 70) for preventing upward movement of the base 34 as described above.

The frame 32 can be fabricated from structural steel, an exemplary configuration of the base 34 for use with the width W of approximately 5 inches being formed of American Standard channel having the width B approximately 6 inches and a length of approximately 12 inches. The boom member 36 can be formed of 3-inch (inside) square structural tubing having a length of approximately 30 inches, being beveled for welding to the base 34 at the angle A being approximately 45°. The rear arm members 44 can be formed from 1¼-inch by ⅜-inch flat steel bar having a length of approximately 6 inches, the arm members 44 overlapping the flange portions 42 of the base 34 approximately 3 inches, being welded thereto. The socket 62 can be formed of a 2-inch (inside) square structural steel tubing, having a length of approximately 9 inches and being beveled at the angle A and welded to the boom member 36. The angle plate 50 can be formed of 3½ by 3½-inch plate angle, the sleeve 56 being formed of 2-inch steel pipe, approximately 6 inches long.

In the frame 32' of FIG. 4, the front arm member 64 can be formed of 3 by 2-inch rectangular structural steel tube, having a length of approximately 17 inches long, being beveled at the angle A and welded to the boom member 36. In the frame 32" of FIG. 5, the front arm member 64' can be formed from the 3×2-inch tubing, extended to a length of approximately 24 inches, the cap member 65 being formed from 2¼-inch by ⅜-inch flat steel bar having a length of approximately 6 inches. A boom yoke and sheave suitable for use as the sheave assembly 38 is available as Model 1000687 from VMI-Tolle of Chanute, Kans.

The frames 32' of FIG. 4 and 32" of FIG. 5 are configured for use with the underlift hoist 14 as Model Wheel Lift Tow Bar, available from Jerr-Dan Underlifts of Greencastle, Pa., the hoist 14 in FIG. 4 being modified by the addition of the socket body 66 as described above. The frame 32 of FIGS. 1–3 is configured for the underlift that is available from Challenger of Mercer, Pa.

Figure 6:
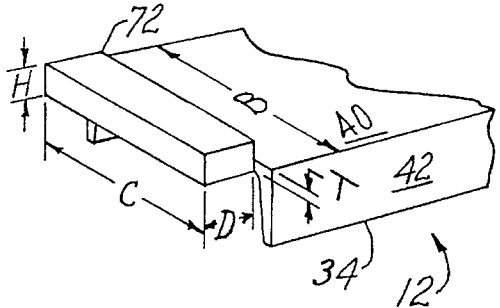
FIG. 6 is an oblique perspective view showing a front base portion of the boom unit of FIG. 3 in an alternative configuration thereof.
Figure 7:
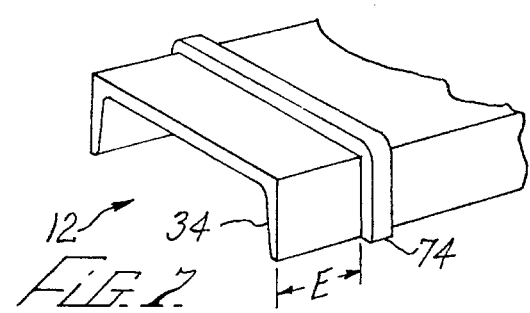
FIG. 7 is a perspective view as in FIG. 6, showing another alternative configuration of the base portion.

With further reference to FIGS. 6 and 7, the apparatus 30 of the present invention is also compatible with underlift hoists manufactured by others including Century, Chevron, Holmes, and No-Mar. In appropriate cases, the base 34 can be formed from other widths B of structural steel channel, such as 7-inch (for Chevron), and the front end of the base 34 can be formed with a spacer extension or block 72 for properly engaging the leg member 22, the block 72 having a length C within the width W of the ram 24, extending a distance D ahead of the channel, and having a height H that can either match a thickness T of the web portion 40 or extend upwardly a greater distance as shown in FIG. 6. For example, the distance D can be approximately 1.5 inches, the height H being approximately 0.3 inches for matching the thickness T. In another example, the distance D can be approximately 1 inch, and the height H can also be approximately 1 inch. In a further example, a stop strap 74 can be welded to the upper side of the web portion 40 and outside surfaces of the flange portions 42, the stop strap 74 being spaced a distance E rearwardly from the front end of the base 34, the stop strap 74 engaging a rear end extremity of the leg member 22, outside of the cavity 46. It is believed that further details of the base 34 are variable within the skill of the art for adapting the frame 32 for locking onto the underlift 14 as described herein.

Although the present invention has been described in considerable detail with reference to certain preferred versions thereof, other versions are possible. For example, the base 34 can be made integral with the spacer block 72. Also, the sheave assembly 38 can be permanently mounted to the frame 32. Therefore, the spirit and scope of the appended claims should not necessarily be limited to the description of the preferred versions contained herein.

What is claimed is:

1. A boom accessory for a flatbed tow truck having a tiltable, extendable bed for receiving a first disabled vehicle, a winch mounted to a forward portion of the bed and having a cable for drawing the first vehicle onto the bed, and an underlift mounted beneath a rear extremity of the bed when the bed is in a transporting position thereof, the underlift having a rearwardly projecting ram for extending and retracting a T-bar or wheel lift, the ram axially projecting forwardly from a head portion thereof into a supporting leg member of the underlift, the leg member being pivotally liftable for raising and lowering the ram, the accessory comprising:

(a) a base for engaging the ram for support thereby;

(b) a boom member rigidly projecting upwardly and rearwardly from the base and having means for rotatably mounting a sheave thereon to movably support the cable; and (c) means for holding the base in engagement with the ram when the ram is retracted against the base.

2. The accessory of claim 1, wherein the means for rotatably mounting comprises a sleeve member extending within the boom member from an end extremity thereof for receiving a stem portion of a sheave assembly.

3. The accessory of claim 2, the sheave assembly further comprising a yoke member, a sheave rotatably mounted to the yoke member, the stem portion being formed on the yoke member.

4. The accessory of claim 1, wherein the head portion of the ram has a forwardly extending element, the accessory further comprising at least one rear arm member rearwardly extending from proximate the base for engaging the forwardly extending element, the at least one rear arm member holding the rear portion of the base in engagement with the ram.

5. The accessory of claim 4, comprising a pair of rear arm members, the rear arm members rearwardly extending proximate opposite sides of the ram when the ram is retracted against the base.

6. The accessory of claim 5, wherein the base includes a structural channel member having a web portion for engaging an upper side of the ram, and opposite flange portions projecting downwardly on opposite sides of the ram, the rear arm members extending from proximate the flange portions of the channel member.

7. The accessory of claim 4, wherein the leg member defines a rearwardly facing cavity adjacent a portion of the ram, a portion of the base being formed for extending within the cavity for locking a front portion of the base proximate an adjacent portion of the ram when the ram is retracted against the base.

8. The accessory of claim 4, wherein the truck includes a laterally extending element, the accessory further comprising a front arm member forwardly extending from proximate the base for engaging the laterally extending element when the base is engaging the ram, the front and rear arm members holding the base in engagement with the ram.

9. The accessory of claim 1, wherein the leg member defines a rearwardly facing cavity, a portion of the base being formed for extending within the cavity for locking a front portion base against an adjacent portion of the ram when the ram is retracted against the base.

10. The accessory of claim 9, wherein the rearwardly facing cavity is located adjacent the ram, and the base includes a structural channel member having a web portion for engaging an upper side of the ram, and opposite flange portions projecting downwardly on opposite sides of the ram, portions of the web and flange portions extending into the cavity.

11. The accessory of claim 9, wherein the leg member includes a hoist hitch receptacle rigidly supported in parallel spaced relation to the ram, and the base includes a front arm extending forwardly of the boom for engaging the hoist hitch receptacle, the front arm holding a front portion of the base in engagement with the ram.

12. The accessory of claim 1, wherein the truck includes a laterally extending element, the accessory further comprising a front arm member forwardly extending from proximate the base for engaging the laterally extending element when the base is engaging the ram, the front arm member holding the front portion of the base in engagement with the ram.

13. The accessory of claim 1, wherein the bed is provided with a plurality of anchor stations, an anchor member being located proximate a free end extremity of the boom member for connection of a stabilizing member between the boom member and a selected one of the anchor stations.

14. The accessory of claim 13, comprising a pair of stabilizing members for engaging corresponding ones of the anchor stations of the truck, the stabilizing elements being tensionable by moving the underlift relative to the anchor stations.

15. The accessory of claim 1, further comprising a rearwardly facing socket member rigidly connected to the boom member for fixably receiving a hitch accessory.

16. A boom accessory for a flatbed tow truck having a tiltable, extendable bed for receiving a first disabled vehicle, a winch mounted to a forward portion of the bed and having a cable for drawing the first vehicle onto the bed, and an underlift mounted beneath a rear extremity of the bed when the bed is in a carrying position thereof, the underlift having a rearwardly projecting ram for extending and retracting a T-bar or wheel lift, the ram axially projecting forwardly from a head portion thereof into a supporting leg member of the underlift, the head portion having a forwardly extending element, the leg being pivotally liftable for raising and lowering the ram, a laterally extending member of the truck being located above the ram, at least a portion of the laterally extending member being located ahead of a rear extremity of the arm, the accessory comprising:

(a) a base for engaging the ram for support thereby;

(b) a boom member rigidly projecting upwardly and rearwardly from the base and having a sheave attachment member proximate an end extremity of the boom member for supporting a rotatably mounted sheave to movably support the cable; and (c) means for holding the base in registered engagement with the underlift when the ram is retracted against the base, comprising:

(i) a first arm member rearwardly extending from proximate the base for engaging the forwardly extending element, the first arm member holding a rear portion of the base against moving away from the ram when the ram is retracted against the base; and (ii) a forwardly extending member rigidly supported relative to the base for engaging the laterally extending member of the truck, for locking a front portion of the base against moving away from the ram when the ram is retracted against the base, wherein the base includes a structural channel member having a web portion for engaging an upper side of the ram, and opposite flange portions projecting downwardly on opposite sides of the ram, and wherein the bed is provided with a plurality of anchor stations, at least one anchor member being defined proximate a free end extremity of the boom member for connection of a pair of stabilizing members between the anchor member and selected ones of the anchor stations.

17. A method for hoisting a load by an existing flatbed tow truck having a tiltable, extendable bed for receiving a first disabled vehicle, a winch mounted to the truck ahead of the bed and having a cable for drawing the first vehicle onto the bed, and an underlift pivotally connected beneath a rear extremity of the bed when the bed is in a retracted position thereof, the underlift having a rearwardly projecting ram for extending and retracting a T-bar or wheel lift, the ram axially projecting forwardly from a head portion thereof into a supporting leg member of the underlift, comprising the steps of:

(a) providing a boom accessory having a base and a boom member extending upwardly and rearwardly from the base, a sheave being rotatably mounted from the boom member;

(b) extending the ram;

(c) resting the base on the ram;

(d) retracting the ram for clamping the base between the head portion of the ram and the leg member;

(e) threading the cable over the sheave;

(f) connecting the cable to the load; and (g) activating the winch for moving and hoisting the load, the cable being movably supported by the sheave.

18. The method of claim 17, wherein the head portion of the ram has a forwardly extending element and the boom accessory includes a first arm member rearwardly extending from proximate the base, the method comprising the further step of engaging the first arm member with the forwardly extending element following the step of extending the ram.

19. The method of claim 18, wherein the leg member defines a rearwardly facing cavity extending forwardly of a rear extremity of the leg, the method comprising the further step of engaging a forwardly projecting portion of the accessory with the rearwardly facing cavity, the base being locked between a portion of the leg and the forwardly extending element in the step of retracting the ram.

20. The method of claim 18, wherein the truck includes a laterally extending element and the boom accessory includes a second arm member forwardly extending from proximate the base, the method comprising the further step of engaging the second arm member with the laterally extending element following the step of extending the ram.

* * * * *